US010651725B2

(12) United States Patent
Wang et al.

(10) Patent No.: US 10,651,725 B2
(45) Date of Patent: May 12, 2020

(54) CONTROL SYSTEM AND CONTROL METHOD FOR REDUCING TOTAL HARMONIC DISTORTION

(71) Applicant: Silergy Semiconductor Technology (Hangzhou) LTD, Hangzhou, ZheJiang Province (CN)

(72) Inventors: Longqi Wang, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/427,503

(22) Filed: May 31, 2019

(65) Prior Publication Data

US 2019/0379273 A1 Dec. 12, 2019

(30) Foreign Application Priority Data

Jun. 11, 2018 (CN) .......................... 2018 1 0594804

(51) Int. Cl.

*H02M 3/156* (2006.01)
*H02M 1/12* (2006.01)
*H02M 1/00* (2006.01)

(52) U.S. Cl.

CPC ............ *H02M 1/12* (2013.01); *H02M 3/156* (2013.01); *H02M 2001/0009* (2013.01)

(58) Field of Classification Search

CPC ...... H02M 3/156; H02M 1/4225; H02M 1/12; H02M 2001/0009

See application file for complete search history.

(56) References Cited

U.S. PATENT DOCUMENTS 6,075,716 A 6/2000 He et al.
6,385,057 B1 5/2002 Barron
8,471,488 B1 6/2013 Hopkins et al.
9,077,260 B2 7/2015 Zhao et al.
9,124,169 B2 9/2015 Garlow et al.
9,525,336 B2 12/2016 Huang
9,635,718 B2 * 4/2017 Kang ................. H05B 33/0815
2009/0243398 A1 10/2009 Yohanan et al.
2009/0302774 A1 * 12/2009 Mednik ............. H05B 33/0815 315/209 R
2011/0050187 A1 * 3/2011 Lai ...................... H02M 3/1588 323/282
2015/0207398 A1 7/2015 Proca
2015/0216007 A1 7/2015 Ferrara et al.
2019/0074821 A1 * 3/2019 Higashi ................ H02M 3/155

* cited by examiner

*Primary Examiner* — Harry R Behm

(74) *Attorney, Agent, or Firm* — Michael C. Stephens, Jr.

(57) ABSTRACT

A method of reducing THD can include: acquiring a first average inductor current during a first conduction time of a main power transistor of a power converter in a switching cycle; acquiring a second average inductor current during a second conduction time and an off time of the main power transistor in the switching cycle; and adjusting the second conduction time of the main power transistor in accordance with a difference between the first and second average inductor currents, where the first and second conduction times are successive.

14 Claims, 8 Drawing Sheets

CONTROL SYSTEM AND CONTROL METHOD FOR REDUCING TOTAL HARMONIC DISTORTION

RELATED APPLICATIONS

This application claims the benefit of Chinese Patent Application No. 201810594804.7, filed on Jun. 11, 2018, which is incorporated herein by reference in its entirety.

FIELD OF THE INVENTION

The present invention generally relates to the field of power electronics, and more particularly to control systems and methods for reducing total harmonic distortion.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
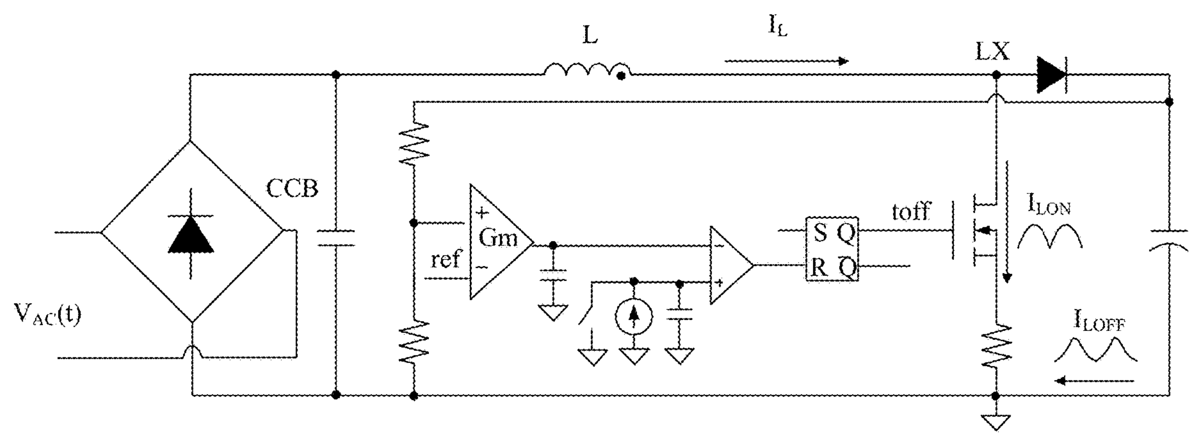
FIG. 1 is a schematic block diagram of an example control circuit with constant on-time control.

With the development of power electronics technology, total harmonic distortion (THD) requirements continued to increase, and this can have a great impact on power equipment. In order to reduce THD, constant on time control may be utilized. Referring now to FIG. 1, shown is a schematic block diagram of an example control circuit with constant on-time control. The constant on time control is that conduction time of a switching transistor of a power converter is constant in one power frequency cycle. In this way, the switching transistor may be controlled to turn on at the valley of the waveform of voltage LX, in order to reduce losses of the switching transistor, and to prevent the switching frequency from being too low.

Thus, capacitor CCB connected between output terminals of a rectifier circuit may not completely discharge. Inductor current $I_L$ is sinusoidal waveform during on-time ton of the transistor (e.g., waveform $I_{LON}$), but may be distorted during off-time toff of the transistor (e.g., waveform $I_{LOFF}$), such that the waveform of the inductor current is not the same-frequency sinusoidal waveform with alternating current (AC) input voltage $V_{AC}(t)$, and a desired THD may accordingly be difficult to obtain.

Figure 2:
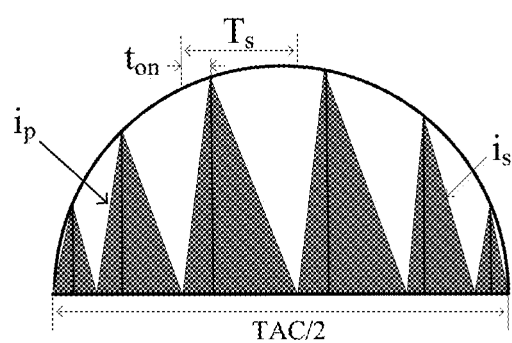
FIG. 2 is a control principle diagram of an example constant on-time control.
Figure 3:
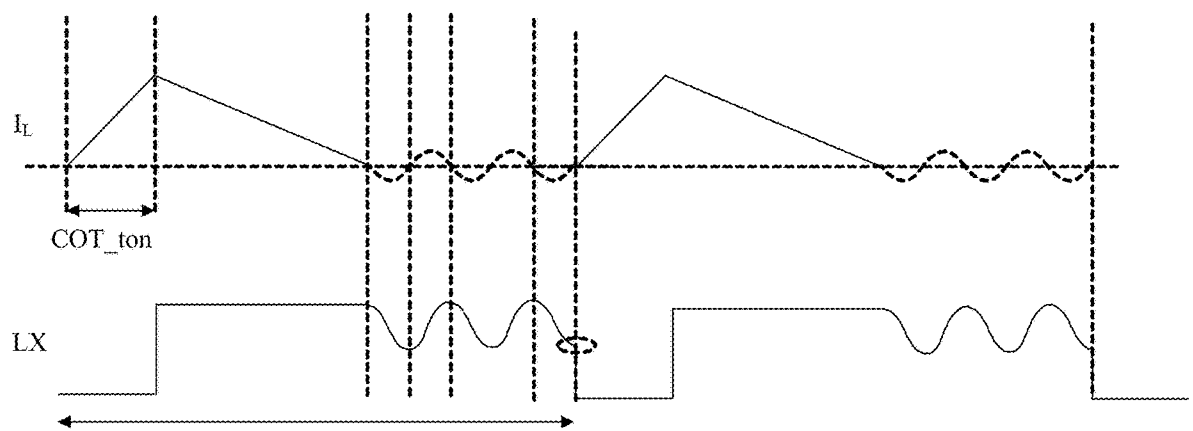
FIG. 3 is a waveform diagram showing example operation of the control circuit in FIG. 1.

Referring now to FIG. 2, shown is a control principle diagram of the example constant on-time control. Referring also to FIG. 3, shown is a waveform diagram showing example operation of the control circuit in FIG. 1. The average value of inductor current $I_L$ during on-time Ton of the transistor is $$\frac{1}{2}\cdot\frac{t_{on}}{L_m}V_{AC}(t),$$

where $L_m$ is the inductance of the inductor. If there is no subsequent oscillation during off-time toff of the transistor, the average value of inductor current $I_L$ during off-time toff of the transistor is also $$\frac{1}{2}\cdot\frac{t_{on}}{L_m}V_{AC}(t).$$

But, because of the subsequent oscillation, the average value of inductor current $I_L$ during off-time toff of the transistor is less than $$\frac{1}{2}\cdot\frac{t_{on}}{L_m}V_{AC}(t),$$

such that the total average value of inductor current $I_L$ during on-time Ton and off-time toff of the transistor is not a function about AC input voltage $V_{AC}(t)$, and the relationship between the AC input voltage and the inductor current may not be linear. Therefore, it may be difficult to obtain a desired THD to reduce its influence on power equipment.

In one embodiment, a method of reducing THD can include: (i) acquiring a first average inductor current during a first conduction time of a main power transistor of a power converter in a switching cycle; (ii) acquiring a second average inductor current during a second conduction time and an off time of the main power transistor in the switching cycle; and (iii) adjusting the second conduction time of the main power transistor in accordance with a difference between the first and second average inductor currents, where the first and second conduction times are successive.

In one embodiment, an apparatus for reducing THD can include: (i) a sampling circuit configured to acquire a first average inductor current during a first conduction time of a main power transistor of a power converter in a switching cycle, and to acquire a second average inductor current during a second conduction time and an off time of the main power transistor in the switching cycle; and (ii) a regulation circuit configured to adjust the second conduction time of the main power transistor based on a difference between the first and second average inductor currents, where the first and second conduction times are successive.

Figure 4:
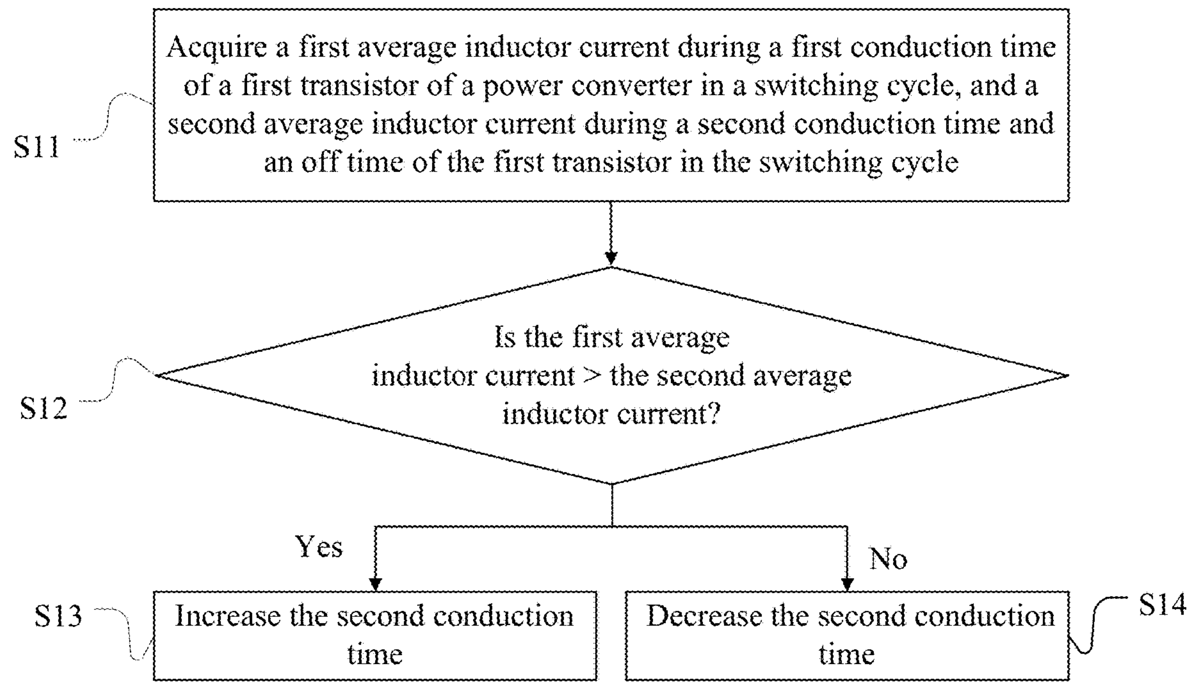
FIG. 4 is a flow diagram of an example control method for reducing total harmonic distortion, in accordance with embodiments of the present invention.

Referring now to FIG. 4, shown is a flow diagram of an example control method for reducing total harmonic distortion, in accordance with embodiments of the present invention. In this particular example, at S11, a first average inductor current may be acquired during (or over) a first conduction time of a main power transistor of a power converter in a switching cycle, and a second average inductor current may be acquired during (or over) a second conduction time and an off time of the main power transistor in the switching cycle. As used herein, an average inductor current that is acquired "during" a given time interval of a transistor operating cycle can be an average inductor current that is calculated "over" that time interval, whereby the actual averaging operation can occur within or outside of that given time interval. At S12, it can be determined whether the first average inductor current is greater than the second average inductor current.

At S11, a first inductor current can be sampled during the first conduction time, a second inductor current can be sampled during a second conduction time, and a third inductor current can be sampled during an off time of the main power transistor in the switching cycle. The first average inductor current is the average of the first inductor current during the first conduction time. The second average inductor current is the average of the second inductor current during the second conduction time and during the off time. In particular embodiments, a switching cycle is made up of the first conduction (on) time interval, the second conduction (on) time interval, and the off time interval, of the main power transistor. Further, the first and second conduction time intervals are successive.

At S13, the second conduction time can be increased when the first average inductor current is greater than the second average inductor current. S14, the second conduction time can be decreased when the first average inductor current is not greater than the second average inductor current. In this example, the second conduction time of the main power transistor can be adjusted to be increased or decreased adaptively, such that the average value of the inductor current during the first conduction time (e.g., the constant on-time interval) can be consistent with the average value of the inductor current during the remaining time (e.g., the second conduction time plus the off time), thereby making the average inductor current over the entire switching cycle the function follow the AC input voltage, and obtaining the desired THD.

Figure 5:
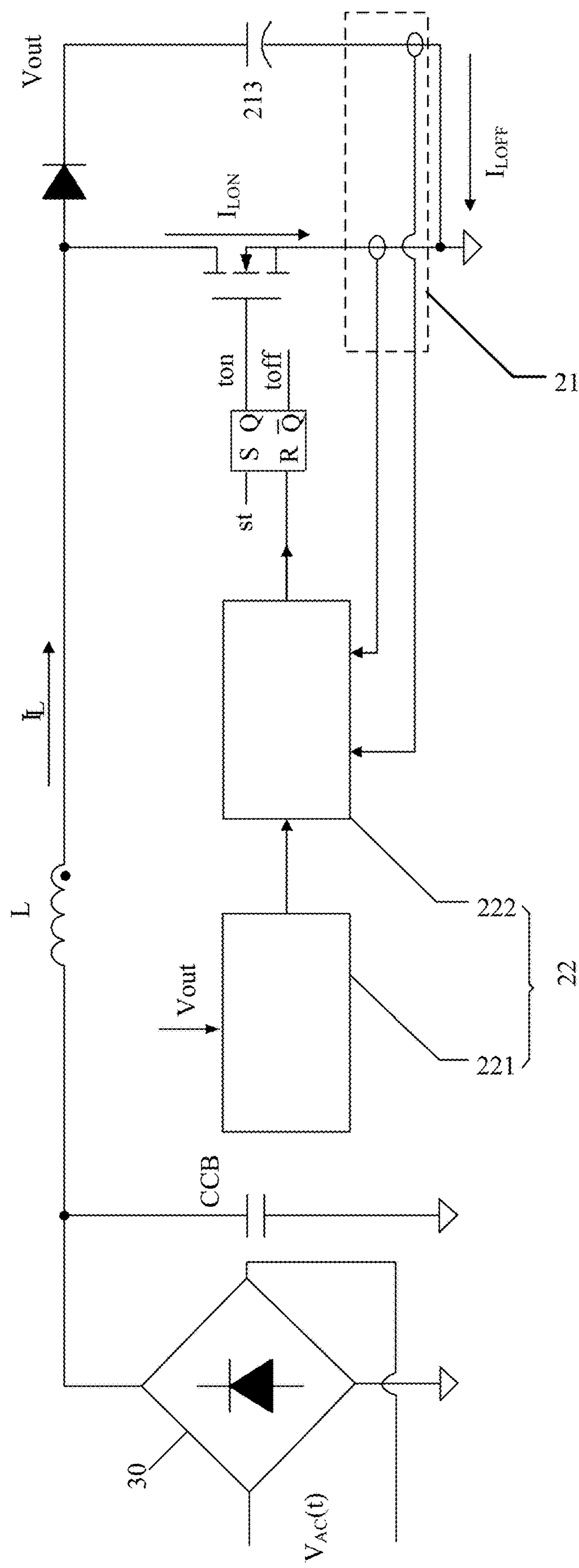
FIG. 5 is a schematic block diagram of a first example control system for reducing total harmonic distortion, in accordance with embodiments of the present invention.

Referring now to FIG. 5, shown is a schematic block diagram of a first example control system for reducing total harmonic distortion, in accordance with embodiments of the present invention. In this particular example, the control system/apparatus can include a power converter (e.g., a boost converter) and a rectifier circuit 30. Rectifier circuit 30 can receive an AC input voltage to generate a DC input voltage. The power converter can include input capacitor CCB, inductor L, a main power transistor, a diode, and capacitor 213. One terminal of the input capacitor can connect to a first terminal of inductor L to receive the DC input voltage from rectifier circuit 30. A second terminal of inductor L can connect to a common node of a first power terminal of the main power transistor and an anode of the diode.

This example control system for reducing THD can include sampling circuit 21 and regulation circuit 22. Sampling circuit 21 can acquire the first average inductor current during the first conduction time of the main power transistor of the power converter in the switching cycle, and the second average inductor current during the remaining time (e.g., the second conduction time plus the off time) of the main power transistor in the switching cycle. Regulation circuit 22 can determine whether the first average inductor current is greater than the second average inductor current, and then may increase the second conduction time when the first average inductor current is greater than the second average inductor current. Regulation circuit 22 may decrease second conduction time when the first average inductor current is not greater than the second average inductor current, where the second conduction time and the first conduction time are successive.

The first average inductor current corresponding to the constant on time interval (e.g., the first conduction time) of the main power transistor of the power converter and the second average inductor current corresponding to the remaining time of the main power transistor can be obtained by the sampling circuit. In this way, a compensation on time (e.g., the second conduction time) of the main power transistor can be adaptively increased or decreased by comparing the first average inductor current against the second average inductor current. This is such that the average value of the inductor current during the first conduction time can be consistent with the average value of the inductor current during the remaining time, thereby making the average value of the inductor current over the entire switching cycle the function following the AC input voltage, and obtaining the desired THD.

For example, regulation circuit 22 can include constant on-time control circuit 221 and conduction compensation control circuit 222. Constant on-time control circuit 221 may control the main power transistor of the power converter to be turned on for a constant period of time during the first conduction time of the main power transistor in the switching cycle. Conduction compensation control circuit 222 can adaptively adjust the second conduction time according to the first and second average inductor currents acquired by sampling circuit 21. Further, regulation circuit 22 may increase the second conduction time when the first average inductor current is greater than the second average inductor current, and may decrease the second conduction time when the first average inductor current is not greater than the second average inductor current.

For example, an input terminal of constant on-time control circuit 221 can connect to an output terminal of the power converter to sense output voltage Vout at the output terminal of the power converter, an output terminal of constant on-time control circuit 221 can connect to a first input terminal of conduction compensation control circuit 222, and the output terminals of sampling circuit 21 can connect to the second and third input terminals of conduction compensation control circuit 222. The output terminal of conduction compensation control circuit 222 can connect to the reset terminal of the RS flip-flop, and the output terminal of the RS flip-flop can connect to the main power transistor.

A set terminal of the RS flip-flop can receive set signal st, which can indicate when inductor current $I_L$ decreases to be relatively small (e.g., zero, or less than a predetermined value). The RS flip-flop may generate signal ton to control the main power transistor to be turned on/off in accordance with an output signal of conduction compensation control circuit 222 and set signal st. In this example, in addition to constant on-time control, conduction compensation control can also be included, and the THD may be reduced by combining constant on-time control circuit and the conduction compensation control circuit.

Figure 6:
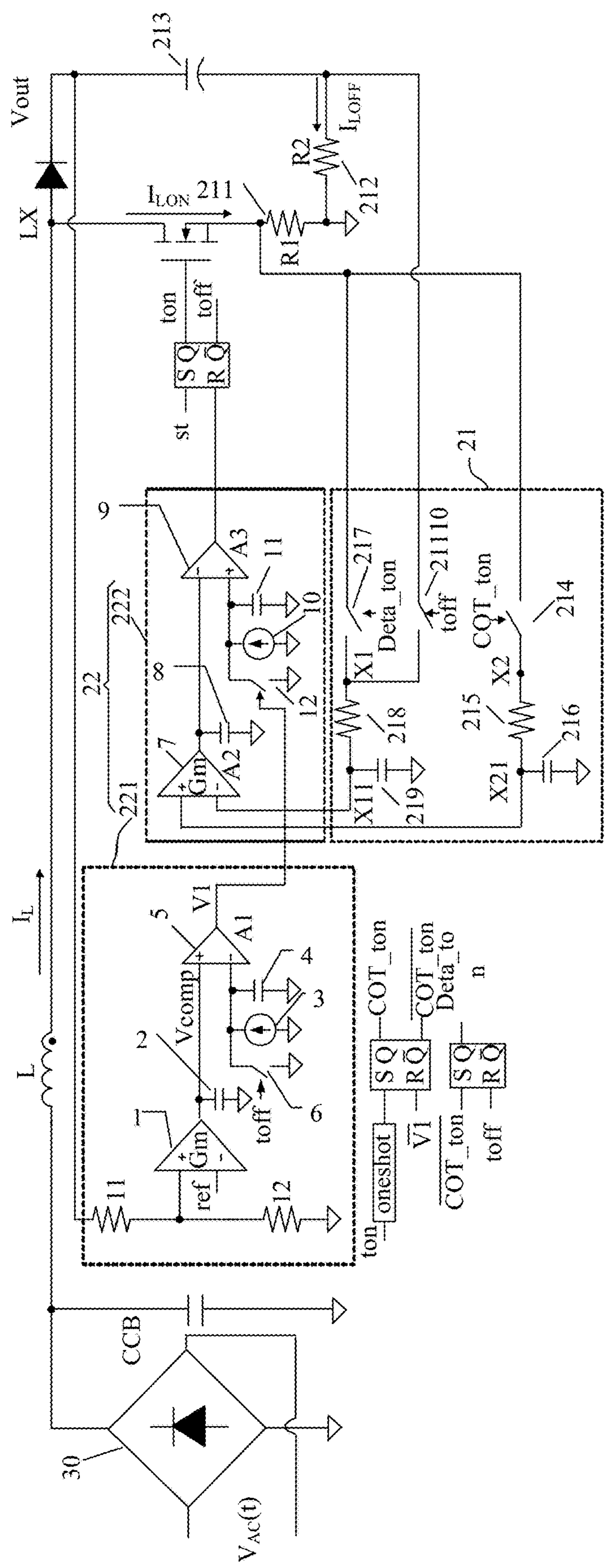
FIG. 6 is a schematic block diagram of a second example control system for reducing total harmonic distortion, in accordance with embodiments of the present invention.

Referring now to FIG. 6, shown is a schematic block diagram of a second example control system for reducing total harmonic distortion, in accordance with embodiments of the present invention. This control system can include a power converter. For example, the power converter is a boost converter including rectifier circuit 30. Rectifier circuit 30 can receive an AC input voltage to generate a DC input voltage. The power converter can include input capacitor CCB, inductor L, a main power transistor, a diode, and capacitor 213. One terminal of the input capacitor can connect to a first terminal of inductor L to receive the DC input voltage. A second terminal of inductor L can connect to a common node of a first power terminal of the main power transistor and an anode of the diode. The regulation circuit can include constant on-time control circuit 221 and conduction compensation control circuit 222.

For example, the control system can also include a voltage divider to divide output voltage Vout sensed at the output terminal of the power converter. The voltage divider can include resistors 11 and 12 connected in series between the first terminal of capacitor 213 and ground. In this example, constant on-time control circuit 221 can include amplifier 1, capacitor 2, comparator 5, and a first ramp circuit. The first ramp circuit can include capacitor 4, constant current source 3, and switch 6 coupled in parallel. A non-inverting input terminal of amplifier 1 can connect to a common node of resistors 11 and 12 to sense the voltage at the output terminal of the power converter, and an inverting input terminal of amplifier 1 can receive reference signal ref provided by a voltage source.

Capacitor 2 can connect to between an output terminal of amplifier 1 and ground. Compensation signal Vcomp can be generated at one terminal of capacitor 2 in response to the voltage difference between the voltage sensed at the output terminal of the power converter and reference signal ref. A non-inverting input terminal of comparator 5 can receive compensation signal Vcomp, and an inverting input of comparator 5 can receive a first ramp signal generated by the first ramp circuit. Constant current source 3, capacitor 4 and switch 6 can connect to in parallel between the inverting input terminal of comparator 5 and ground. Switch 6 can be controlled to be turned on/off according to the switching state of the main power transistor. One terminal of capacitor 4 can connect to the inverting input terminal of comparator 5, and may generate the first ramp signal. Output signal V1 of comparator 5 may be provided to conduction compensation control circuit 222.

Conduction compensation control circuit 222 can include amplifier 7, capacitor 8, comparator 9, and a second ramp circuit. The second ramp circuit can include constant current source 10, capacitor 11, and switch 12 coupled in parallel. A non-inverting input terminal of amplifier 7 can connect to the first output terminal of sampling circuit 21 to sense the first average inductor current, and an inverting input terminal of amplifier 7 can connect to the second output terminal of sampling circuit 21 to sense the second average inductor current. Capacitor 8 can connect to between an output terminal of amplifier 7 and ground. A second compensation signal can be generated at one terminal of capacitor 8 in response to the difference between the first and second average inductor currents. An inverting input terminal of comparator 9 can receive the second compensation signal, and a non-inverting input terminal of comparator 9 can receive a second ramp signal generated by the second ramp circuit. Constant current source 10, capacitor 11, and switch 12 can connect to in parallel between the non-inverting input terminal of comparator 9 and ground. Switch 12 can be controlled by output signal V1 of comparator 5. One terminal of capacitor 4 can connect to the non-inverting input terminal of comparator 9, and may generate the second ramp signal. An output terminal of comparator 9 can connect to the reset terminal of the RS flip-flop.

A set terminal of the RS flip-flop can receive signal st that indicates inductor current $I_L$ decreasing to be relatively small (e.g., zero, or less than a predetermined value), and the RS flip-flop can generate on-time signal ton and turn-off signal toff for controlling the main power transistor in accordance with an output signal of conduction compensation control circuit 222 and set signal st. Further, sampling circuit 21 can include a first sampling circuit for sampling a first inductor current during the first conduction time of the main power transistor, a second sampling circuit for sampling a second inductor current during the second conduction time of the main power transistor, and a third sampling circuit for sampling a third inductor current during the off time of the main power transistor. Also, the power converter can further include sampling resistors 211 and 212. A first terminal of sampling resistor 211 can connect to the second power terminal of the main power transistor of the power converter, and a second terminal of sampling resistor 211 can be grounded. Capacitor 213 can connect to between the output terminal of the power converter and a first terminal of sampling resistor 212, and a second terminal of sampling resistor 212 may be grounded.

The first sampling circuit can include control switch 214 controlled by turn-on signal COT_ton, resistor 215, and capacitor 216. A first terminal of control switch 214 can connect to a first terminal of sampling resistor 211, and a second terminal of control switch 214 can connect to a first terminal of resistor 215. A second terminal of resistor 215 can connect to a first terminal of capacitor 216 and the non-inverting input terminal of amplifier 7, and a second terminal of capacitor 216 may be grounded.

The second sampling circuit can include control switch 217 controlled by turn-on signal Deta_ton, resistor 218, and capacitor 219. A first terminal of control switch 217 can connect to the first terminal of sampling resistor 211, and a second terminal of control switch 217 can connect to a first terminal of resistor 218. A second terminal of resistor 218 can connect to a first terminal of capacitor 219 and the inverting input terminal of amplifier 7, and a second terminal of capacitor 219 may be grounded.

The third sampling circuit can include resistor 218 and capacitor 219 described above, and may further include shutdown control switch 2110 controlled by turn-off signal toff. A first terminal of shutdown control switch 2110 can connect to the first terminal of sampling resistor 212, and a second terminal of shutdown control switch 2110 can connect to the first terminal of resistor 218.

The control system can also include a logic circuit for generating turn-on signals COT_ton and Deta_ton based on output signal V1, turn-off signal toff, and on-time signal ton. The logic circuit can include first and second RS flip-flops. A set terminal of the first RS flip-flop can receive on-time signal ton through a single trigger circuit, a reset terminal of the first RS flip-flop can receive the inverted version of output signal V1, and the first RS flip-flop can generate turn-on signal COT_ton and the inverted version of turn-on signal COT_ton. A set terminal of the second RS flip-flop can receive the inverted version of turn-on signal COT_ton, a reset terminal of the second RS flip-flop can receive turn-off signal toff, and the second RS flip-flop can generate turn-on signal Deta_ton.

Figure 7:
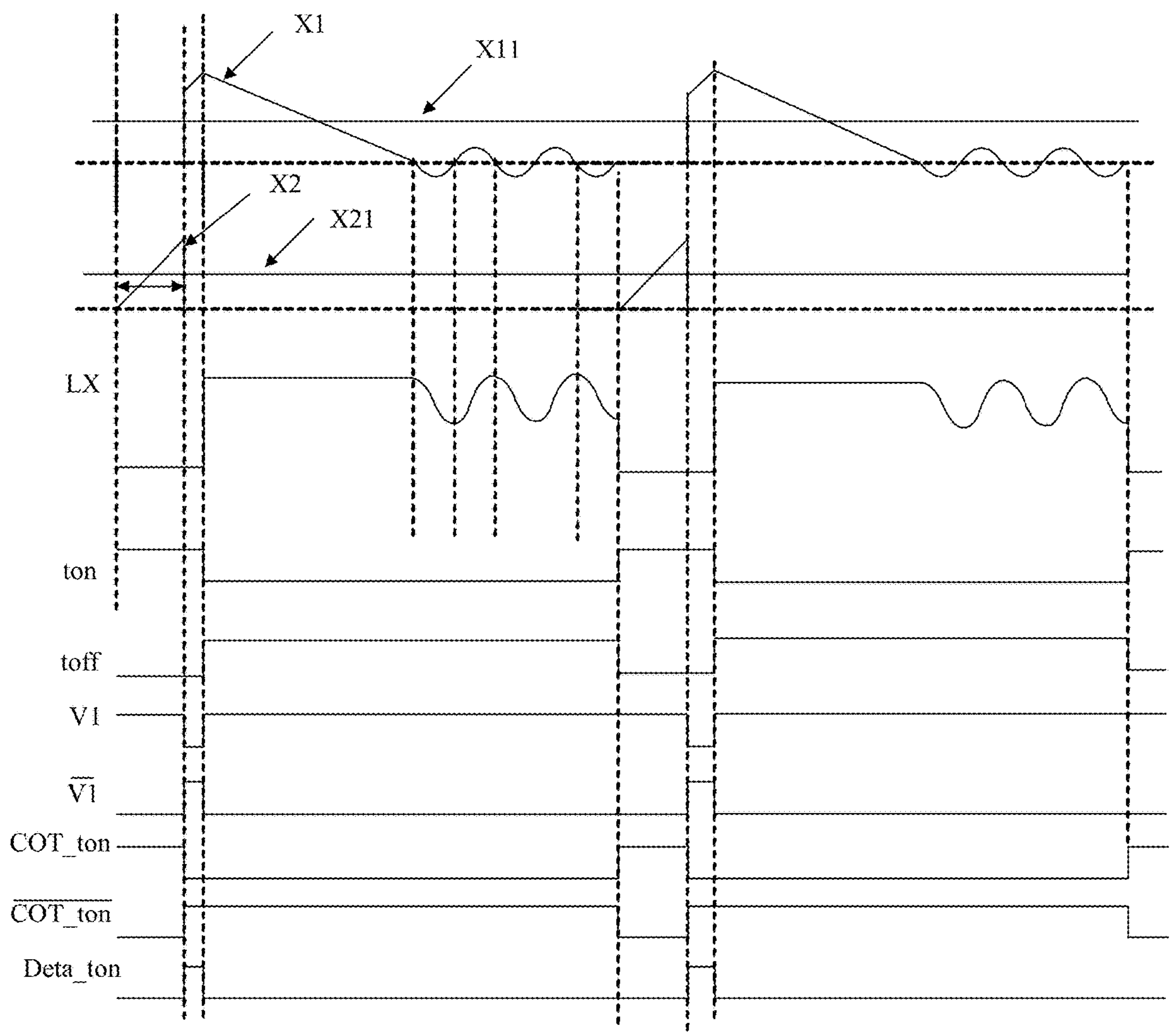
FIG. 7 is a waveform diagram showing example operation of the control system of FIG. 6, in accordance with embodiments of the present invention.

Referring now to FIG. 7, shown is a waveform diagram showing example operation of the control circuit of FIG. 6, in accordance with embodiments of the present invention. In a switching cycle, when signal st is active, turn-on signal COT_ton can be high. In this example, compensation signal Vcomp may be substantially unchanged; that is, the output signal of amplifier 1 may be substantially unchanged. In this way, the time period during which the first ramp signal at the inverting terminal of comparator 5 increases to compensation signal Vcomp is fixed, such that the period that output signal V1 of comparator 5 is high can be fixed. When the first ramp signal increases to compensation signal Vcomp, output signal V1 of comparator 5 may be low, and turn-on signal COT_ton can be low.

Turn-on signal COT_ton for characterizing the first conduction time can be set when signal st is active, and can be reset when the first ramp signal increases to a level of compensation signal Vcomp (e.g., output signal V1 can be low). Turn-on signal Deta_ton for characterizing the second conduction time can be set when turn-on signal COT_ton is reset, and can be reset when turn-off signal toff is active (e.g., the second ramp signal increases to the level of second compensation signal). The off time can be from a time instant of turn-off signal toff being active to a time instant of set signal st being active.

For example, amplifier 7 is a transconductance amplifier. When voltage X21 at the non-inverting terminal of amplifier 7 is greater than voltage X11 at the inverting terminal of amplifier 7 (e.g., the first average inductor current is greater than the second average inductor current), the output voltage of amplifier 7 may be increased. In this way, the time period during which the second ramp signal at the non-inverting terminal of comparator 9 increases to the output voltage of amplifier 7 can be increased, such that the time period that turn-on signal Deta_ton is high can be increased, in order to increase the second conduction time.

Further, output signal V1 can control the second ramp circuit to generate the second ramp signal, and the second conduction time can be adjusted by comparing the second ramp signal against the output voltage of amplifier 7. Turn-on signal Deta_ton can be high from a time instant of output signal V1 being low (e.g., when the first on time interval ends) to a time instant that the second ramp signal increases to the level of the output voltage of amplifier 7, thereby achieving the continuity of the second on-time interval and the first on-time interval.

Figure 8:
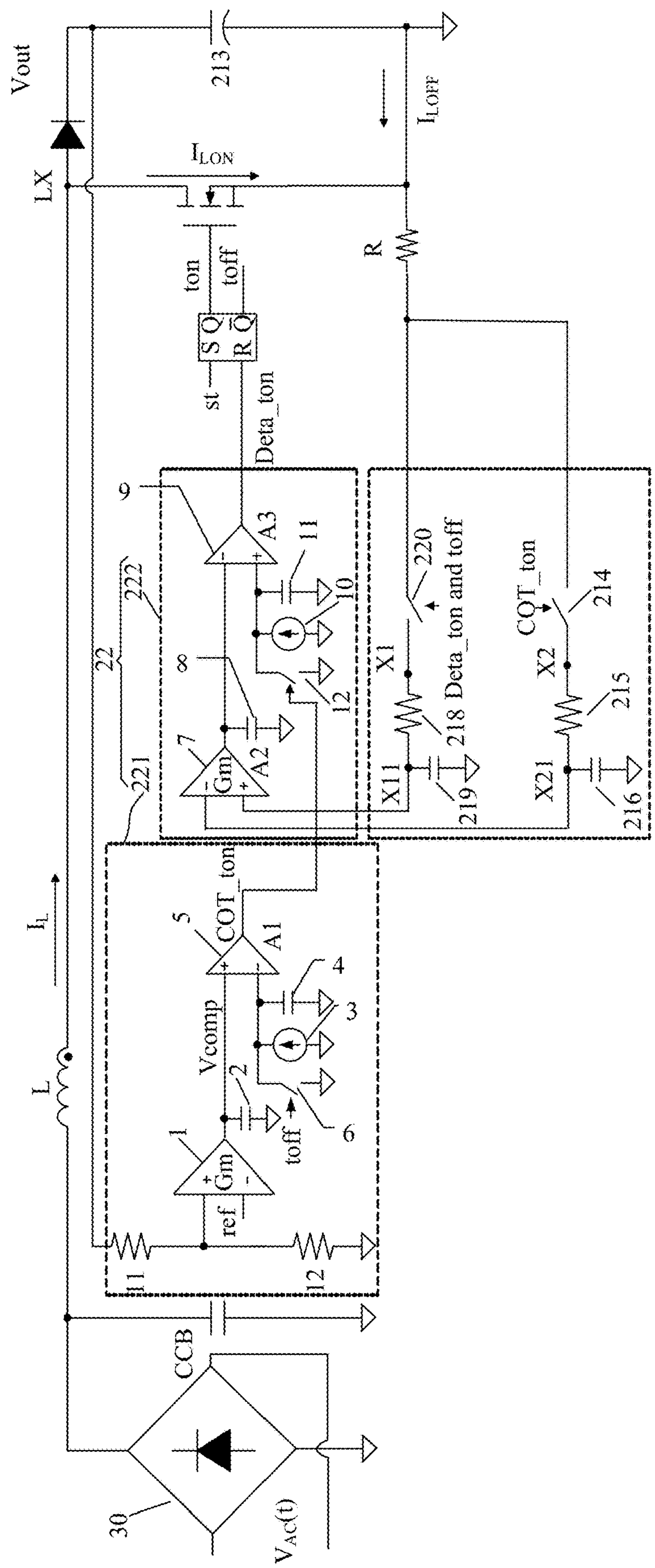
FIG. 8 is a schematic block diagram of a third example control system for reducing total harmonic distortion, in accordance with embodiments of the present invention.

Referring now to FIG. 8, shown is a schematic block diagram of a third example control system for reducing total harmonic distortion, in accordance with embodiments of the present invention. In this example, the control system can include sampling circuit 21 and regulation circuit 22. Here, the signals received by the non-inverting input terminal and the inverting input terminal of comparator 7 may be exchanged relative to that of FIG. 8. Constant time control circuit 221 can include amplifier 1, capacitor 2, comparator 5, and a first ramp circuit. The first ramp circuit can include capacitor 4, constant current source 3, and switch 6 coupled in parallel. A non-inverting input terminal of amplifier 1 can connect to a common node of resistors 11 and 12 to sense the voltage at the output terminal of the power converter, and an inverting input terminal of amplifier 1 can receive reference signal ref provided by a voltage source.

Capacitor 2 can connect to between an output terminal of amplifier 1 and ground. Compensation signal Vcomp can be generated at one terminal of capacitor 2 in response to the voltage difference between the voltage sensed at the output terminal of the power converter and reference signal ref. A non-inverting input terminal of comparator 5 can receive compensation signal Vcomp, and an inverting input of comparator 5 can receive a first ramp signal generated by the first ramp circuit. Constant current source 3, capacitor 4, and switch 6 can connect to in parallel between the inverting input terminal of comparator 5 and ground. One terminal of capacitor 4 can connect to the inverting input terminal of comparator 5, and may generate the first ramp signal. In this example, the output signal of comparator 5 is turn-on signal COT_ton, and may be provided to conduction compensation control circuit 222.

Conduction compensation control circuit 222 can include amplifier 7, capacitor 8, comparator 9, and a second ramp circuit. The second ramp circuit can include constant current source 10, capacitor 11, and switch 12 coupled in parallel. An non-inverting input terminal of amplifier 7 can connect to the first output terminal of sampling circuit 21 to sense the first average inductor current, and an inverting input terminal of amplifier 7 can connect to the second and third output terminals of sampling circuit 21 to sense the second average inductor current. Capacitor 8 can connect to between an output terminal of amplifier 7 and ground. A second compensation signal can be generated at one terminal of capacitor 8 in response to the voltage difference between the first average inductor current and the second average inductor current. An inverting input terminal of comparator 9 can receive the second compensation signal, and a non-inverting input terminal of comparator 9 can receive a second ramp signal generated by the second ramp circuit.

Constant current source 10, capacitor 11, and switch 12 can connect to in parallel between the non-inverting input terminal of comparator 9 and ground. Switch 12 may be controlled by turn-on signal COT_ton. One terminal of capacitor 4 can connect to the non-inverting input terminal of comparator 9, and may generate the second ramp signal. An output terminal of comparator 9 can connect to the reset terminal of the RS flip-flop, and the output signal of comparator 9 can be conduction signal Deta_ton in in this case. The sampling circuit can include a fourth sampling circuit configured to sample the first average inductor current at the first on time interval of the switching cycle, and a fifth sampling circuit configured to sample the second average inductor current at the second on time interval and the turn-off time interval of the switching cycle.

In this example, the power converter can only provide sampling resistor R. A first terminal of sampling resistor R can connect to between the second power terminal of the main power transistor, and the second terminal of capacitor 213 (e.g., ground), and a reference ground. The input terminals of the fourth and fifth sampling circuits can connect to the reference ground. The fourth sampling circuit can include control switch 214 controlled by turn-on signal COT_ton, resistor 215, and capacitor 216. The first terminal of control switch 214 can connect to a second terminal of sampling resistor R. The second terminal of resistor 215 can connect to the inverting input terminal of amplifier 7 and the first terminal of capacitor 216, and the second terminal of capacitor 216 may be grounded.

In this example, the fifth sampling circuit may sample the second average inductor current corresponding to the second on time interval and the off time interval. The fifth sampling circuit can include multiplexing control switch 220 controlled by turn-on signal Deta_ton and turn-off signal toff, resistor 218, and capacitor 219. A first terminal of multiplexing control switch 220 can connect to the second terminal of sampling resistor R. A second terminal of multiplexing control switch 220 can connect to the first terminal of resistor 218. The second terminal of resistor 218 can connect to the first terminal of capacitor 219 and the non-inverting input terminal of amplifier 7, and the second terminal of capacitor 219 may be grounded.

In particular embodiments, control circuits and methods for reducing THD may be provided. By comparing the first average inductor current during the constant on-time interval against the second average inductor current during the remaining time interval (e.g., the second conduction time plus the off time) of the main power transistor, the length of compensation on-time of the main power transistor can be adaptively increased or decreased, such that the average values of the inductor current during the constant on-time interval and the remaining time interval are consistent. In this way, the average value of the inductor current over the entire switching cycle may follow the AC input voltage, and the expected THD can be obtained.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of reducing total harmonic distortion (THD), the method comprising:

a) acquiring a first average inductor current during a first conduction time of a main power transistor of a power converter in a switching cycle;

b) acquiring a second average inductor current during a second conduction time and an off time of said main power transistor in said switching cycle; and c) adjusting said second conduction time of said main power transistor in accordance with a difference between said first and second average inductor currents, wherein said first and second conduction times are successive.

2. The method of claim 1, wherein said adjusting said second conduction time comprises:

a) determining whether said first average inductor current is greater than said second average inductor current;

b) increasing said second conduction time of said main power transistor when said first average inductor current is greater than said second average inductor current; and c) decreasing said second conduction time of said main power transistor when said first average inductor current is not greater than said second average inductor current.

3. The method of claim 1, wherein said acquiring said first and second average inductor currents comprises:

a) sampling a first inductor current during said first conduction time;

b) sampling a second inductor current during said second conduction time;

c) sampling a third inductor current during an off time of said main power transistor in said switching cycle;

d) generating said first average inductor current based on an average of said first inductor current during said first conduction time; and e) generating said second average inductor current based on an average of said second inductor current during said second conduction time and said third inductor current during said off time.

4. An apparatus for reducing total harmonic distortion (THD), comprising:

a) a sampling circuit configured to acquire a first average inductor current during a first conduction time of a main power transistor of a power converter in a switching cycle, and to acquire a second average inductor current during a second conduction time and an off time of said main power transistor in said switching cycle; and b) a regulation circuit configured to adjust said second conduction time of said main power transistor based on a difference between said first and second average inductor currents, wherein said first and second conduction times are successive.

5. The apparatus of claim 4, wherein said second conduction time of said main power transistor is increased by said regulation circuit when said first average inductor current is greater than said second average inductor current, and said second conduction time of said main power transistor is decreased by said regulation circuit when said first average inductor current is not greater than said second average inductor current.

6. The apparatus of claim 4, wherein said sampling circuit is configured to:

a) sample a first inductor current flowing through said main power transistor during said first conduction time;

b) sample a second inductor current flowing through said main power transistor during said second conduction time;

c) sample a third inductor current flowing through a second transistor coupled in series with said main power transistor during an off time of said main power transistor in said switching cycle;

d) generate said first average inductor current based on an average of said first inductor current during said first conduction time; and e) generate said second average inductor current based on an average of said second inductor current during said second conduction time and said third inductor current during said off time.

7. The apparatus of claim 4, wherein said regulation circuit comprises a constant on-time control circuit configured to generate a first turn-on signal for characterizing said first conduction time based on a feedback voltage representative of an output voltage of said power converter, in order to control said main power transistor to be turned on for a constant period of time corresponding to said first conduction time.

8. The apparatus of claim 7, wherein said regulation circuit further comprises a conduction compensation control circuit configured to generate a first compensation signal based on said difference between said first and second average inductor currents, and to regulate said second conduction time by adjusting said first compensation signal.

9. The apparatus of claim 8, wherein when said first turn-on signal is inactive, said conduction compensation control circuit is configured to control a first ramp signal to increase to said first compensation signal, in order to generate a second turn-on signal for characterizing said second conduction time.

10. The apparatus of claim 9, wherein said regulation circuit further comprises a logic circuit configured to generate an on-time signal to control said main power transistor to be turned on when a set signal representing that an inductor current of said power converter is low is activated, and to generate a turn-off signal for controlling said sampling circuit when said second conduction time ends.

11. The apparatus of claim 10, wherein said sampling circuit comprises:

a) a first sampling circuit coupled to said main power transistor, and being configured to obtain said first average inductor current during said first conduction time when said first b) a second sampling circuit coupled to said main power transistor, and being configured to obtain an average inductor current at said second conduction time when said second turn-on signal is active; and c) a third sampling circuit coupled to a second transistor that is coupled to said main power transistor, and being configured to obtain an average inductor current during said off time when said turn-off signal is active.

12. The apparatus of claim 10, wherein said sampling circuit comprises:

a) a fourth sampling circuit configured to obtain said first average inductor current at said first conduction time when said first turn-on signal is active; and b) a fifth sampling circuit configured to obtain said second average inductor current when said second turn-on signal and said turn-off signal are active, wherein said fourth and fifth sampling circuits are coupled to one terminal of a sampling resistor, and another terminal of said sampling resistor is coupled to said main power transistor.

13. The apparatus of claim 10, wherein said second turn-on signal for characterizing said second conduction time is active from a time instant of said first turn-on signal going inactive to a time instant of said turn-off signal being activated.

14. The apparatus of claim 4, wherein said power converter comprises a boost converter.

* * * * *